Figure 1:
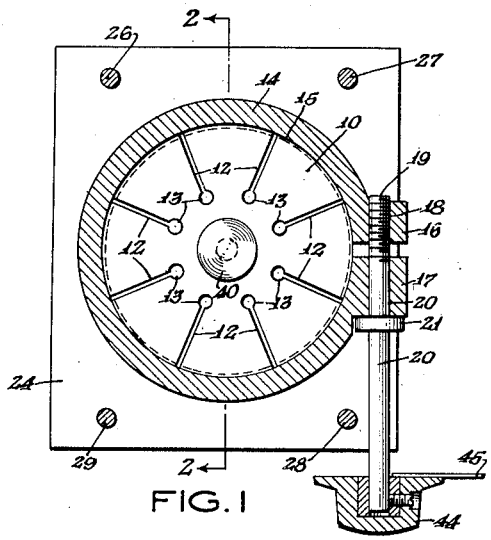

Oct. 24, 1944.                      D. E. GRAY                      2,361,193

CONTROL DEVICE, PARTICULARLY THERMOSTATIC DEVICE

Filed July 12, 1939                    2 Sheets-Sheet 1

INVENTOR
Donald E. Gray
BY
J. O. Ollier
ATTORNEY

Oct. 24, 1944.  D. E. GRAY  2,361,193

CONTROL DEVICE, PARTICULARLY THERMOSTATIC DEVICE

Filed July 12, 1939  2 Sheets-Sheet 2

INVENTOR
Donald E. Gray
BY
*J. O. Ollier*
ATTORNEY

Patented Oct. 24, 1944

2,361,193

UNITED STATES PATENT OFFICE 2,361,193

CONTROL DEVICE, PARTICULARLY THERMOSTATIC DEVICE

Donald E. Gray, Teaneck, N. J., assignor to Radio Patents Corporation

Application July 12, 1939, Serial No. 283,931

3 Claims. (Cl. 297—15)

This invention relates to electrical control devices and more particularly to thermostatic control devices employing a bi- or multimetallic body or disc for effecting the desired controlling action.

Thermostatic control devices of this type generally comprise a body composed of two sheets of metals which are dissimilar as to their thermal expansion. The metals employed possess, so to speak, different temperature expansion coefficients. The sheets are in firm and intimate contact at adjacent surfaces.

Thermostatic devices of this type possess, however, a slow and gradual motion only, i. e., small internal stresses in the composite body, caused by the rise in temperature, produce small deformations of the body and slight movements of the device. Such devices are therefore impractical for many purposes, where sudden action and extended travel of the controlled elements are required, as is the case with electric switches, carrying substantial currents, thermostatically controlled valves and similar devices.

In order to improve thermostatic devices of this type, it has been proposed to predeform or bend a bimetallic oblong sheetlike composite body, so that upon increasing temperature and internal stresses caused thereby in the composite body, these stresses overcome the counteracting stresses imparted to the body by its predeformation and result at a certain critical temperature in a snap action. Thereby the composite body swings from its initial predeformed position into a substantially opposite position resulting in a relatively long way of travel of its most deformed portion.

With all these devices great care had to be taken in choosing the metals and dimensioning the sheet to be composed thereof in order to secure the action of the device at the desired critical temperature.

It is an object of this invention to provide an electrical control device which is adjustable at any of a plurality of degrees of a condition such as of temperature and/or pressure within a predetermined range.

Another object is to provide an electrical control device which is easily adjustable over a wide range of controlling conditions such as of temperature and/or pressure.

Another object of the invention is to provide a thermal control device responding to a small difference of temperature to move from the engaged into the disengaged position of its control members and vice versa.

A further object of the invention is to provide a thermal control device which is easy to manufacture, simple in construction and positive and reliable in operation.

Figure 2:
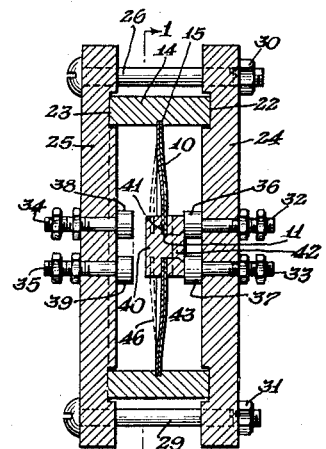
Figure 3:
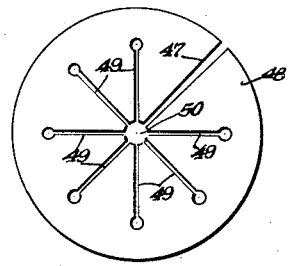
Figure 4:
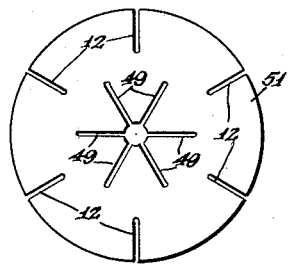
Figure 5:
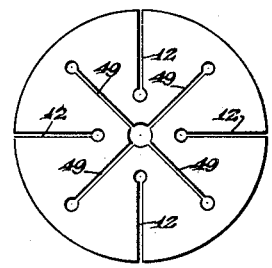
Figure 6:
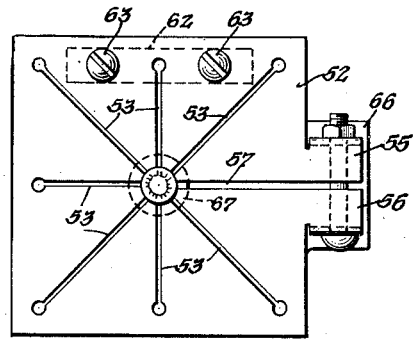
Figure 7:
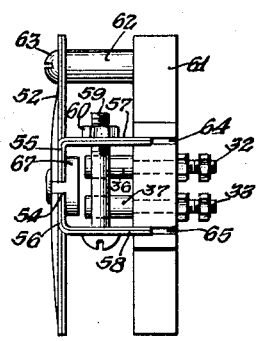
Figure 8:
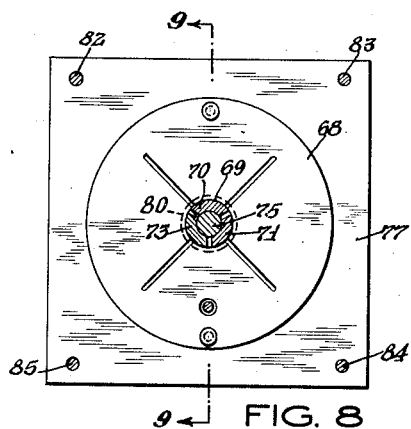
Figure 9:
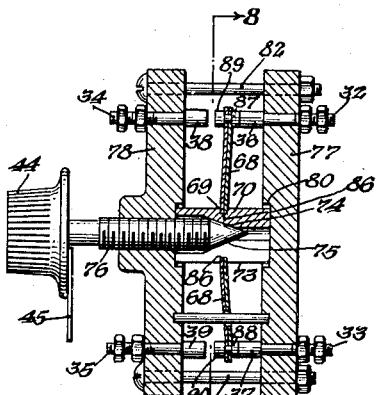
Figure 10:
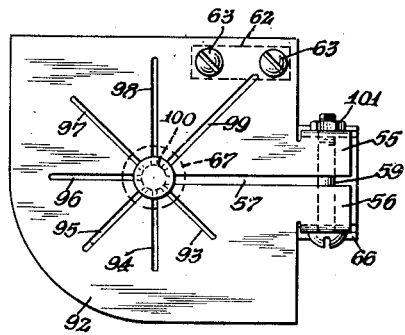
Figure 11:
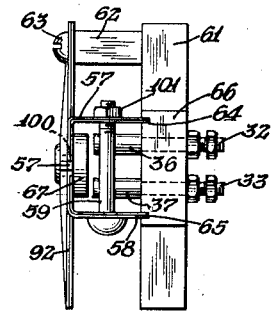
Figure 12:
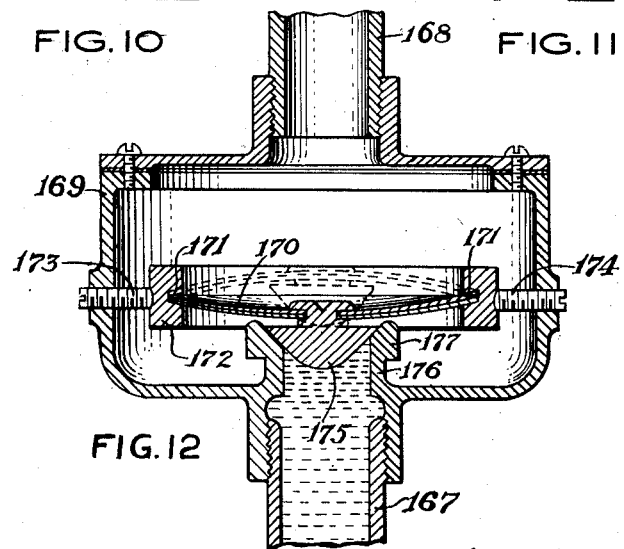

Other objects of the invention will be more clearly understood when the specification proceeds with reference to the drawings wherein by way of exemplification Fig. 1 shows partly in cross-section and partly in plane view, taken along line 1—1 in Fig. 2, and Fig. 2 in cross-section taken along line 2—2 in Figure 1 a thermostatic switch embodying my invention, Figs. 3, 4 and 5 show in plane view several different features of a thermostatic body, employed by my invention, Fig. 6 shows in plane view and Fig. 7 in side elevation another thermostatic switch embodying my invention, Fig. 8 shows partly in plane view and partly in cross-section taken along line 8—8 in Fig. 9, and Fig. 9 in cross-section along line 9—9 in Figure 8 still another feature of my invention in which the thermostatic body is adjusted at its center, Fig. 10 in plane view and Fig. 11 in side elevation show another embodiment of my invention wherein the thermostatic body is adjusted at a place of its circumference, and Fig. 12 shows a cross-section through a valve device employing my invention.

In the drawings, identical reference numerals used in different figures indicate similar parts or elements.

According to my invention there are employed thermostatic bodies, comprising two dissimilar metal sheets or layers, bonded together on adjacent surfaces by welding, rolling, riveting or the like, as is well known in the art.

Dissimilar metals concerned by my invention are two metals or metal alloys, having different thermal coefficients of expansion. If it is desired for any reason, such as to decrease the fatigue strains between the bonded surfaces of two metal sheets or layers in order to obtain more accurate control, or to obtain other desirable characteristics in the thermostatic body, more than two dissimilar metals are used. Such multimetallic bodies or discs may preferably be composed, e. g., in such a manner that the inner metallic layer or layers have intermediate thermal coefficients of expansion in relation to the outer metallic layers. In general it is to be preferred to arrange the multi-metallic layers in such a manner that a metal having the lower thermal coefficient of expansion is on one side of the disc or body and a metal having the higher thermal coefficient of expansion is on the opposite side of the disc or body, and a metal or metals having intermediate coefficients of expansion are arranged in between according to their expansion values progressively from the lower to the higher thermal coefficient value. A suitable progressive arrangement of metal layers from the lower value to the higher thermal coefficient value may suitably be, e. g., platinum, nickel, copper and silver.

For the sake of simplicity I refer in the following description and appended claims to multi-metallic bodies or discs which may comprise therefore two or more sheets or layers of dissimilar metals.

Referring to Figs. 1 and 2, a multi-metallic and initially substantially plane disc 10 is provided with a central hole 11 and preferably radially disposed slots 12, enlarged for instance circularly at the inner ends 13. A somewhat resilient ring 14 split at 91 is provided with a groove 15 to receive the outer edge of disc 10 and is further provided with a flange 16 and 17, respectively, at each side of split 91. Flange 16 is provided with a screw-threaded hole 18 engaged by the screw-threaded end 19 of stud 20. Flange 17 is provided with a hole through which stud 20 passes with sufficient clearance. Stud 20 is also provided with a shoulder 21 engaging the outside surface of flange 17 so that upon turning of stud 20 in one or the other direction the diameter of resilient ring 14 increases or decreases, and thereby body 10 is more or less compressed and bent outwardly.

Stud 20 may also be provided at its free end with a knob 44 and pointer 45 which cooperates with a calibrated temperature dial (not shown) for visually indicating the diameter of ring 14 and thereby the corresponding operating range of temperature of the thermostatic switch.

Ring 14 engages wider grooves 22 and 23 of bodies or plates 24 and 25 preferably of insulating material, these grooves being wide enough to permit the adjustment of the diameter of ring 14 in the way described above. Plates 24 and 25 are connected by suitable means, such as bolts 26, 27, 28 and 29, secured in position by means of nuts 30 and 31.

In this exemplification of my invention, each of the insulating bodies 24 and 25 is passed through by a pair of terminals 32, 33 and 34, 35, respectively, ending in contacts 36, 37 and 38, 39 respectively. Each of these pairs of terminals may be connected in an electrical circuit.

In the center hole 11 of body 10 a bridging contact is arranged consisting of a contact portion 40 provided with a shoulder 41 and a reduced protruding bolt 42 headed at its end for holding in place contact ring 43.

It will be appreciated that by turning knob 44 and thereby stud 20 in one or the other direction, the curvature of body 10 and the strains therein evolved can be adjusted. The greater these strains are, the higher is the temperature range at or within which the snap action occurs.

It will be further appreciated that by arrangement of slots 12 in any desired or proper number, in cooperation with the pressure exercised upon the body for proper adjustment of ring 14, simple and easy manufacture is secured and accurate operation of the multi-metallic body can be readily achieved. In particular, the number and length of slots 12 depends upon the size of disc 10 and the resiliency desired.

In operation, the diameter of ring 14 is adjusted by means of knob 44, so as to secure the desired curvature of body 10 at normal, e. g., room temperature. Body 10 is shown in Fig. 2 in full lines in that normal position. If the temperature increases to the degree to which the switch action is adjusted, disc 10 is heated so far that the strains caused therein by the heat eventually overcome the elastic strains set up in disc 10 by ring 14, and disc 10 will immediately and completely move or snap into the position shown in broken lines 46 in Fig. 2.

Supposing that at normal temperature the circuit connected with terminals 32, 33 was to be kept closed, it is obvious that upon rise of temperature to the critical degree at which the snap action of disc 10 occurs, this circuit will be opened. Assuming further that at such critical or higher temperatures the electrical circuit, connected with terminals 34, 35, is to be closed, it is apparent that contact 40 will bridge contacts 38, 39 upon snapping of disc 10 into its position 46.

As soon as the temperature falls again below its critical value, and disc 10 cools off correspondingly, it will return by snap action to its normal or initial position, as shown in full lines 10, Fig. 2.

Instead of providing slots 12 extending substantially radially from the outside circumference of disc 10, there may be arranged slots 49 extending from the center of the multi-metallic disc 48, as shown in Fig. 3.

In order to facilitate the adjustment of the curvature of disc 48, there is preferably provided a slot 47 passing from the outer circumference of disc 48 to its center hole 50.

There may also be provided slots 12 extending substantially radially from the outside circumference, and slots 49 extending from the center of disc 51, as shown in Fig. 4. Another similar arrangement with enlarged ends of the slots is shown in Fig. 5.

In the embodiment of my invention as shown in Figs. 6 and 7, there is provided a disc-like and initially substantially plane, multi-metallic body 52 of other than circular shape, such as a square shape as shown in these figures. Body 52 is again provided with slots 53 of equal or different length, extending for instance from a center hole 54 and enlarged at their ends. Body 52 is provided with protruding portions or flaps 55, 56 on both sides of a slot 57 which corresponds to slot 47 in Fig. 3 and permits the desired adjustment of the curvature of body 52 and thereby of the elastic strains to be set up therein. The critical temperature at which the snap action of body 52 is to occur, can readily be adjusted by more or less pressing together these portions 55, 56. To this effect the ends 57, 58 of portions 55 and 56 are bent about vertically to the plane of body 52 and provided with holes through which a screw stud 59 passes. By turning knob 60, secured on that stud, the distance of portions 55 and 56 can readily be adjusted, and thereby the critical temperature at which the snap action of disc 52 occurs.

A support 61 of any suitable material, such as insulating material, is provided with a bracket 62 on which disc 52 is secured, e. g., by means of screws 63. The ends 57 and 58 of portions 55 and 56 may suitably be held in slots 64, 65 of a protruding portion 66 of their support or base member 61.

In this exemplification of my invention it is assumed that two terminals 32, 33 are passed through the base member 61 and provided with contacts 36 and 37 corresponding to those shown in Fig. 2. In the center hole 54 of the multi-metallic disc 52, a bridging contact 67 is riveted in. If base member 61 does not consist of insulating material, terminals 32 and 33 are to be covered by insulating sleeves or the like, where they pass through the base member.

In operation, disc 52 will be in the position shown in Fig. 7 at normal or initial temperature. As soon as the temperature rises up to or above a critical value, disc 52 is heated to a point where snap action occurs, as described above with reference to Figs. 1 and 2, and contact 67 will be swung to the right and bridge over contacts 36 and 37, thereby closing an electrical circuit connected with terminals 32, 33. Upon cooling, disc 52 will snap back into its initial position and thereby interrupt the circuit.

It will also be appreciated that by properly positioning and dimensioning contacts 36 and 37, Figs. 7 or 2, as well as contacts 38 and 39, Fig. 2, a kind of stop can be provided for the curvature of disc 52 or 10, respectively, when compressed in order to avoid excessive movements or curvatures of the disc.

In the embodiments of my invention described above I have shown means of compressing and thereby adjusting a multi-metallic body or disc from its outside circumference. In Figs. 8 and 9 there is shown another embodiment of my invention, according to which the desired strains in the thermostatic body are set up and adjusted from its inside.

In Figs. 8 and 9, 68 is an initially substantially plane, multi-metallic and preferably circular body or disc provided with a center hole 69 into which an expansion sleeve is inserted comprising a suitable number of sectors 70, 71 and 73.

The sleeve composed of those sectors is provided with a tapered hole 74, engaged by the tapered end 75 of a stud screw 76 which is provided with a knob 44 and pointer 45, in the same way and for the same purposes as stud 20 in Fig. 1. Supports or base members 77 and 78 of suitable material, such as insulating material, are arranged on both sides and spaced from body 68; they are provided on opposite sides with grooves 79 and 80, into which the expansion sleeve fits with sufficient clearance to permit any desired expansion of that sleeve in practical use.

Stud 76 passes through and engages a corresponding screw threaded hole 81 of support 78. Supports 77 and 78 are connected by bolts 82, 83, 84 and 85. Terminals 32 and 33, provided with contacts 36, 37, respectively, are passed through the base member 77 and terminals 34, 35 are passed through the top member 78, ending in contacts 38 and 39 for the same purpose as described with reference to Fig. 2.

The sectors of the expansion sleeve are provided with aligned grooves 86 engaged by the inner edge of the center hole 69 of the thermostatic multi-metallic body 68. In assembling, the sectors are inserted into hole 69, then slightly expanded to engage the inner edge of body 68, and thereupon inserted in the recesses 79, 80 of the members 77, 78. Thereupon these members are connected by means of bolts 82 to 85. By turning stud 76, the sectors are moved radially outward to a desired extent, thereby setting up elastic strains in body 68 from its center, and applying to it a desired curvature as to be seen from Fig. 9. Thereby the critical temperature at which a snap action of the switch occurs, can readily be adjusted.

In this embodiment of my invention contacts 87, 88, 89 and 90 are arranged near the outer circumference of disc 68 and connected therewith in a manner that electrical current can pass from one contact 87 or 89 through disc 68 unto another contact 88 or 90.

Contacts 36 to 39 and 87 to 90 are conveniently dimensioned and arranged in such a way that by cooperation of contacts 87, 88, and contacts 36, 37, respectively, the initial or normal temperature is adjusted as well as excessive curvatures of disc 68 prevented.

In operation, as soon as the critical temperature is reached or passed, at which snap action of disc 68 occurs, contacts 36, 37 and 87, 88 will be opened and contacts 38, 39 and 39, 90 be closed. Thereby the circuit connected with terminals 32, 33 will be open and the other circuit connected with terminals 34, 35 will be closed. Upon fall of the temperature and reversed snap action of disc 68, the last mentioned circuit will be opened again and the first mentioned closed.

In the embodiment of my invention, shown in Figs. 10 and 11, an initially substantially plane, multi-metallic body or disc 92 is provided with slots 93, 94, 95, 96, 97, 98 and 99, preferably of different lengths and again extending from a center hole 100 of that body. Body 92 may be of any desired shape, such as a square shape, as shown in Figs. 5 to 7; in this embodiment of my invention one corner of the square shape is rounded off. As described with reference to Figs. 5 and 7, body 92 is provided with protruding portions or flaps 55, 56 on both sides of a slot 57 which extends from the center hole 100 to the outside; the ends 57, 58 of these flaps are bent about vertically to the plane of body 92, and passed through by an adjusting screw stud 59 which is provided with a nut 101 for the same purpose and effect as described with reference to Figs. 5 and 7. By adjusting nut 101 the elastic strains set up in body 92 and thereby the critical temperature at which snap action occurs can be readily adjusted. Similar to the feature shown in Figs. 5 to 7, body 92 is mounted on a bracket 62 by means of screws or the like 63. Bracket 62 is mounted on a base member 61 preferably of insulating material and provided with a protruding portion 66 having slots 64, 65 to receive the ends 57, 58 of flaps 55, 56. The base member is passed through by terminals 32, 33 provided with contacts 36, 37 and in the center hole 100 of body 92 a bridging contact 67 is riveted for the same purpose and effect as described with reference to Figs. 5 to 7.

In operation the thermostatic switch according to Figs. 10 and 11 works in the same way as described with reference to the switch shown in Figs. 5 to 7.

Referring to Fig. 12, there is shown a tube 167 provided with an enlarged portion 169 and continued by another tube 168. In the enlarged portion an initially substantially plane, multi-metallic disk 170 is arranged of the type as disclosed in any of the foregoing figures, e. g., Figs. 1 and 2, the outer edge of which engages a groove 171 of a resilient ring 172. This ring is supported within the enlarged passage 169 by means of set screws or the like 173, 174 passing liquid-tightly through the walls of passage 169 so that they can be adjusted from the outside. Preferably six such screws are provided, though a larger or smaller number (three as a minimum) can be used.

In the center of disk 170 a plug 175 is mounted in any convenient way; in Fig. 12, the plug is riveted through a center hole of the disk.

Tube 167 is continued within the enlarged passage 169 by ring 176 provided with a circular seat 177 into which plug 175 in the positon of disk 170 shown in the drawings, fits.

It will be appreciated that by adjusting the set screws 173, 174 the diameter of ring 172 and thereby the pressure exerted upon disk 170 can be adjusted, resulting in a desired curvature of disk 170, whereby plug 175 is pressed liquid-tightly against seat 177 with desired pressure.

Assuming that a fluid such as a liquid has to pass through tube 167 and passage 169 into the continuing tube 168 when a certain critical temperature, or range of temperatures, in the atmosphere surrounding passage 169 and/or in the fluid standing in tube 167 and contacting plug 175 is exceeded, it will be appreciated that upon rise of the temperature to such a critical value, or range, disk 170 will be heated so far that the strains set up thereby in its multi-metallic body will eventually overcome the counteracting strains imparted to it by ring 172, and disk 170 will swing by snap action into a substantially opposite position as shown by broken lines in Fig. 12. Thereby plug 175 is lifted from seat 177 and the fluid in tube 167 permitted to pass into the space of passage 169 and to flow into tube 168. As soon as the temperature in the surrounding atmosphere and/or the fluid falls below the critical value, or range, disk 170 will soon cool off and return by snap action to its initial position shown in full lines, thereby closing the valve.

What I claim is:

1. A thermostatic controlling device, comprising a circular and spring disc-like and initially substantially plane multi-metallic element having an outer circumferential edge and provided with a hole resulting in an inner circumferential edge distant from and inside said outer edge, said element capable of actuating a control member as exemplified by an electrical contact and valve plug, a plurality of slots extending substantially radially over a considerable length of said element, said slots arranged at substantially equal angles with one another and ending in one of said edges, at least one of said slots ending in said outer circumferential edge of said element, a resilient ring slidably engaging a circumferential edge, said ring being slotted and provided with rigid means for adjusting the diameter of and thereby the pressure exerted by said ring upon said element for bending and thereby curving said element and setting up therein elastic strains of predetermined value to be overcome by counteracting strains caused in said element by a predetermined change of thermal conditions, resulting in moving of said element into an opposite curved position by snap action.

2. A controlling device, comprising a springy substantially disclike and flat multi-metallic element capable of actuating a control member as exemplified by an electrical contact, said element provided with a center hole and a plurality of slots extending substantially radially from said hole over a considerable length of said element, adjustable pressure means engaging the circumferential edge of said hole capable of expanding the diameter of said hole and thereby to bend and curve said element and set up therein elastic strains of predetermined value to be overcome by counteracting strains caused in said element by a predetermined change in a condition exemplified by pressure and temperature to which said element is subjected, resulting in moving said element into an opposite curved position by snap action.

3. A controlling device, comprising a springy disc-like and flat, initially substantially plane element having an outer circumferential edge and provided with a hole resulting in an inner circumferential edge distant from and inside said outer edge, said element capable of actuating a control member as exemplified by an electrical contact and valve plug, a plurality of slots extending substantially radially over a considerable length of said element and ending in one of said edges, adjusting pressure means engaging one of said circumferential edges, at least one of said slots ending in the edge so engaged, said means adjusted so as to bend and thereby curve said element and set up therein elastic strains of predetermined value to be overcome by counteracting strains caused in said element by a predetermined change of a condition exemplified by pressure and temperature, resulting in moving of said element into an opposite curved position by snap action.

DONALD E. GRAY.